(12) United States Patent
Zhang et al.

(10) Patent No.: US 9,183,460 B2
(45) Date of Patent: Nov. 10, 2015

(54) DETECTING MODIFIED IMAGES

(71) Applicant: Google Inc., Mountain View, CA (US)

(72) Inventors: John R. Zhang, New York, NY (US); Charles J. Rosenberg, Cupertino, CA (US); Yang Song, San Jose, CA (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/690,381

(22) Filed: Nov. 30, 2012

(65) Prior Publication Data

US 2015/0169988 A1 Jun. 18, 2015

(51) Int. Cl.
*G06K 9/62* (2006.01)
(52) U.S. Cl.
CPC .................................... *G06K 9/6202* (2013.01)
(58) Field of Classification Search
None
See application file for complete search history.

(56) References Cited

U.S. PATENT DOCUMENTS

| | | | | |
|---|---|---|---|---|
| 5,867,282 | A * | 2/1999 | Fredlund et al. | 358/450 |
| 6,674,905 | B1 * | 1/2004 | Matsugu et al. | 382/199 |
| 8,385,689 | B2 * | 2/2013 | Chandrashekar et al. | 382/294 |
| 2012/0268488 | A1 * | 10/2012 | Masuko | 345/629 |

OTHER PUBLICATIONS

Carneiro, G. and Jepson A.D., "Flexible Spatial Models for Grouping Local Image Features" CVPR'04 Proceedings of the 2004 IEEE computer society conference on Computer vision and pattern recognition, pp. 747-754, 8 pages.
Määttä, J. et al., "Face Spoofing Detection From Single Images Using Micro-Texture Analysis" (online) [Retrieved on May 17, 2013]. Retrieved from the internet: <www.ee.oulu.fi/research/mvmp/mvg/files/pdf/131.pdf>, 7 pages.
Zhang and Liu, "Detecting Irregularities by image contour Based on Fuzzy Neural Network." The 3rd International Conference on Innovative Computing Information and Control (ICICIC'08), IEEE Computer Society, 4 pages.
He et al., 'Detecting Doctored JPEG Images Via DCT Coefficient Analysis,' ECCV 2006, Part III, LNCS 3953, pp. 423-435, 2006, 13 pages, Jul. 21, 2015.

* cited by examiner

*Primary Examiner* — Thomas Conway
(74) *Attorney, Agent, or Firm* — Fish & Richardson P.C.

(57) ABSTRACT

Methods, systems and apparatus for identifying modified images based on visual dissimilarity to a first image. In an aspect, a method includes determining, for each of a first image and a second image, a respective set of local image feature descriptions; determining one or more unmatched regions of the images that include unmatched image features and that correspond to one or more same respective regions in both the first image and the second image; determining, for each of the one or more unmatched regions of the images, a modification measure based on the image data corresponding to the unmatched region in the first image and the image data corresponding to the unmatched region in the second image; and determining that the second image is a modification of the first image when one of the modification measures meets a modification measure threshold.

18 Claims, 7 Drawing Sheets

DETECTING MODIFIED IMAGES

BACKGROUND

This specification relates to detecting modified images.

The Internet provides access to a wide variety of resources such as video or audio files, web pages for particular subjects, book articles, or news articles. There are many resources available, and to help users find resources that may be of interest to them, many companies have developed search systems that identify resources in response to a query. For textual searches, search queries usually are terms and phrases. For image searches, such as search of still images and videos, the search queries can be images, or terms and phrases, or a combination of images, terms and phrases. A search system ranks the resources in response to the query and provides search results that link to the identified resources. The search results are typically ordered for viewing according to the rank.

SUMMARY

In general, one aspect of the subject matter described in this specification can be implemented in methods that include the actions of determining, for each of a first image and a second image, each of the first and second image comprising respective image data depicting visual content, a respective set of local image feature descriptions, each local image feature description describing a local image feature detected in the image and the location of the local image feature within the image; determining one or more unmatched regions of the images that include unmatched image features and that correspond to one or more same respective regions in both the first image and the second image; determining, for each of the one or more unmatched regions of the images, a modification measure based on the image data corresponding to the unmatched region in the first image and the image data corresponding to the unmatched region in the second image; and determining that the second image is a modification of the first image when one of the modification measures meets a modification measure threshold. This and other embodiments of this aspect include corresponding systems, apparatus, and computer program products.

Particular embodiments of the subject matter described in this specification can be implemented so as to realize one or more of the following advantages. Modified images that may be spoofy can be identified even when such images do not have associated traffic signal data, classification labels, or text descriptions that are used to identify spoofy images. The detection process is robust in the presence of quantization and compression changes for an image, and also robust against cropping, scaling, resizing, and color/hue/lighting adjustment. This is especially useful for images available on the Internet, as these images are often decoded and re-compressed multiple times, and many images are cropped, resized and adjusted.

The details of one or more embodiments are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Overview

As described above, a search system may rank resources in response to a query. The ranking process may include ranking resources based on the performance of the resource with respect to the particular query. For example, some search systems rank resources having a selection rate, or a high hover rate, for a particular query higher than resources having a lower selection rate or hover rate for the particular query. The general assumption under such an approach is that queries are often an incomplete expression of the information needed, and the user's actions of selecting a particular resource is a signal that the resource is at least as responsive to, or more responsive to, the user's informational need than the other identified resources.

Image resources may be modified to create modified images. The modifications may be characterized according to types. For example, some modifications may preserve the content of the image but may adjust color, contrast or lighting. Such modifications are characterized as image quality modifications. Another type of modification is characterized as "spoofy" modifications. An image with a spoofy modification, or simply a "spoof" or "spoofy image," is an image that has been modified in a subtle (or not so subtle) way to convey a satirical, political, or even an offensive message. Typically an image with a spoofy modification will not satisfy a user's informational need, unless the user is searching for spoofy images. Thus, unless a search system has information indicating that a user is searching for spoofy images, the search system will demote spoofy images when ranking images responsive to a query.

The subject matter of this application relates to a process to identify modified images based on visual dissimilarity to a first image. A modified image is "spoofy" when an obvious modification is made to its canonical version so as to convey a humorous or offensive message.

Identifying modified images based on the image content alone is difficult. For example, an image may be subtly modified to create a modified image, such as by adding a moustache to the face of a political figure. These modifications may be difficult to classify based on a computer visual feature analysis of the image alone.

The subject matter of this application identifies images that have been modified based on a comparison of image data of a first image to image data of a near-duplicate second image. A portion of the first image and a respective modified portion of the near-duplicate second image are processed to determine if the modification is indicative of a "spoofy" modification.

In particular, a first image, the query image, and a second image, which is determined to be visually similar to the first image, are identified as an image pair. The images are aligned and respective local features are determined for the images. Matching local features and unmatched local features between the images are identified, and from the unmatched features one or more unmatched regions are generated. In some implementations, the unmatched regions define an image mask. Using the image mask, the system then processes the image data from within the unmatched regions to determine if certain types of modifications have been made. Such modifications include, for example, facial modifications and text modifications. If such modifications are present, the reference image may be characterized as a "spoofy" image. Alternatively, the reference image may be characterized as a candidate "spoofy" image that is flagged for additional detection processing.

These features and other features are described in more detail below.

Example Environment

Figure 1A:
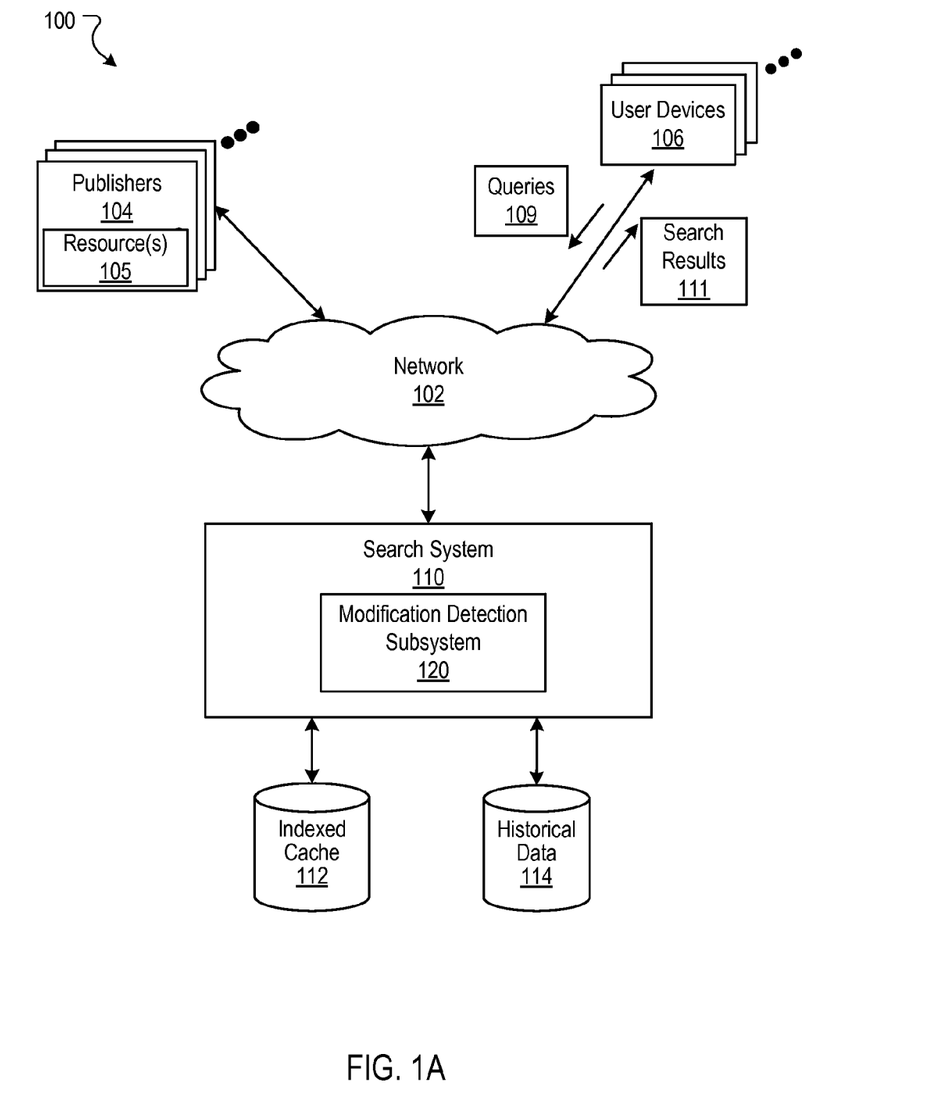
FIG. 1A is a block diagram of an example environment in which a modification detection subsystem can be used.

FIG. 1A is a block diagram of an example environment 100 in which a modification detection subsystem 120 can be used. The example environment 100 includes a network 102, e.g., a local area network (LAN), wide area network (WAN), the Internet, or a combination of them, connects publishers 104, user devices 106, and the search system 110. The environment 100 may include many thousands publishers 104 and user devices 106. The modification detection subsystem 120 is shown as a component of the search system 110; however, the subsystem 120 may be implemented as a system that is separate from the search system 110.

A publisher 104 is a website of one or more resources associated with a domain name and hosted by one or more servers. An example website is a collection of web pages formatted in hypertext markup language (HTML) that can contain text, images, multimedia content, and programming elements, e.g., scripts. Each website is maintained by a publisher 104, e.g., an entity that manages and/or owns the website. Throughout this document the term "publisher" may be used interchangeably with "website."

A resource is any data that can be provided by the website 104 over the network 102 and that is associated with a resource address. Resources include HTML pages, documents, feed sources, and image data, such as still images or video, to name just a few.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources provided by the publishers 104. Data about the resources can be indexed based on the resource to which the data corresponds. The indexed and, optionally, cached copies of the resources are stored in an indexed cache 112.

The user devices 106 submit search queries 109 to the search system 110. In response, the search system 110 accesses the indexed cache 112 to identify resources that are relevant to the search query 109. The search system 110 identifies the resources generates search results 111 that identify the resources and returns the search results 111 to the user devices 106. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page.

The user devices 106 receive the search results, e.g., in the form of one or more web pages, and render the pages for presentation to users. In response to the user selecting a link in a search result at a user device 106, the user device 106 requests the resource identified by the link. The website 104 hosting the resource receives the request for the resource from the user device 106 and provides the resource to the requesting user device 106.

Search queries 109 submitted during user sessions are stored in a data store such as the historical data store 114. Selection data specifying actions taken in response to search results provided are also stored in a data store such as the historical data store 114. These actions can include whether a search result was selected, whether a search result was hovered over and if so for how long, and other user interactions taken with respect to search results. The data stored in the historical data store can be used to map search queries 109 submitted during search sessions to resources that were identified in search results 111 and the actions taken by users.

As described above, some images may be spoofy images. The indexed cache may include data identifying known spoofy images. The identification of spoofy images may be performed by the modification detection subsystem 120, and optionally one or more other systems. The resulting data identifying spoofy images is stored in the indexed cache, and the search system 110 uses this data to determine which images that are responsive to a query are spoofy, and whether to demote the images that are identified as such.

Images are constantly being added by the publishers, and many of these images are modifications of existing images. For such images, it is difficult for a detection system to determine if the image that is modified is a spoofy image based solely on the fact that a modification has been made. For example, an image may be modified to alter the color balance or reduce contrast. Such a modification may not be considered to be a "spoofy" modification. On the other hand, an image may be modified to convey a humorous, satirical or even an offensive message, which is a "spoofy" modification.

Figure 2A:
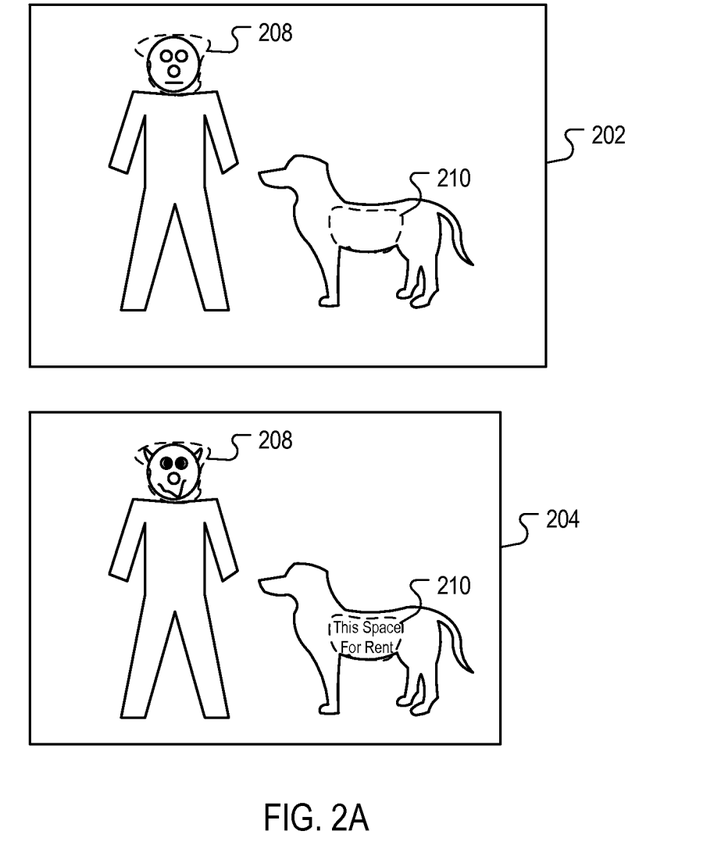
FIG. 2A depicts a first image and a second image that is a modification of the first image.

An example of a spoofy modification is shown in FIG. 2A, which depicts a first image 202 and a second image 204 that is a modification of the first image 202. The first image 202 may be, for example, an original image of a person and a dog. The second image 204 is a modification of the first image 202. In particular, the second image has been cropped, the face of the person has been altered, and a textual message has been added to the dog. The regions 208 and 210 are regions of the images that are respectively compared to determine if an image modification has been made, and the creation of the regions 208 and 210 is described in more detail with respect to FIGS. 3 and 5.

Assume that the image 202 is of a political figure, and the image 204 is created by a user with the intent to convey a message of political satire. Once the modified image 204 is provided by a publisher 104, many other users may create similar modifications to the image 202, because political figures are often the subject of political commentary and satire. Accordingly, there may be many modified images 204 that are "near duplicates" of the original image 202. When another user is searching for information regarding the political figure, the user's informational need may not be satisfied by the multitude of spoofy images. Accordingly, unless there is a signal that the user is searching for spoofy images (e.g., the user inputs the query "Funny Images of the President"), the search system 110 will demote the spoofy images.

Image Modification Detection

The modification detection subsystem 120 is used to process a first image and find second images that are visually similar to the first images. Assuming that the first image is known to not be a spoofy image, it follows that the second images that are visually similar to the first image may be spoofy images.

Figure 1B:
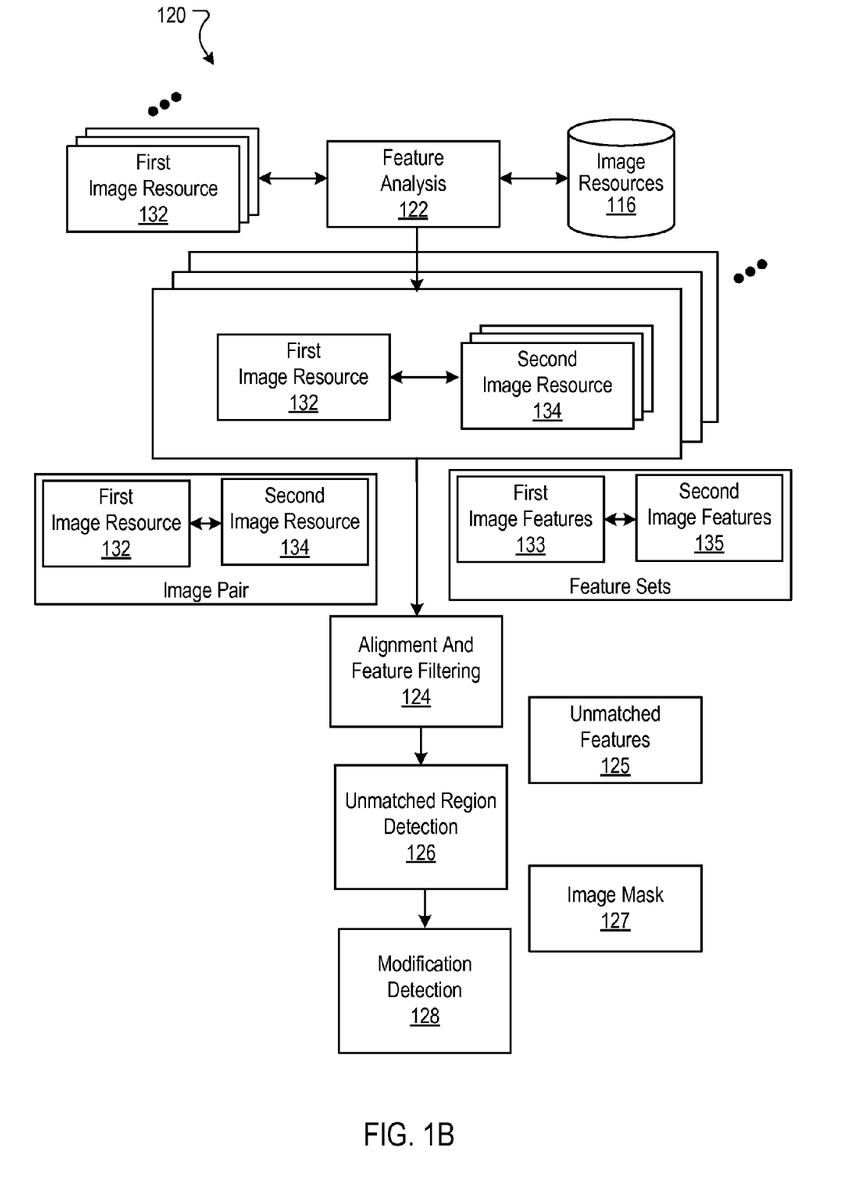
FIG. 1B is a block diagram of an example process flow in the modification detection subsystem.
Figure 3:
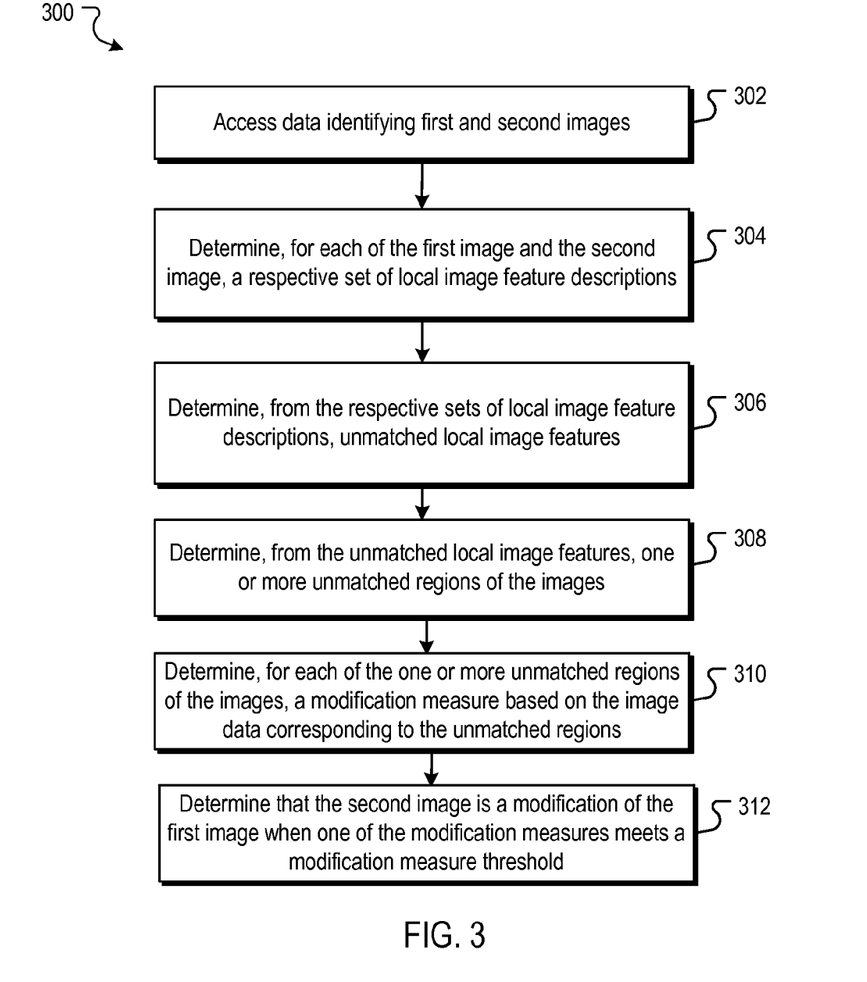
FIG. 3 is a flow diagram of an example process for detecting a modification of a first image in a second image.

Operation of the detection subsystem 120 is described with reference to FIG. 1B, which is a block diagram of an example process flow in the modification detection subsystem 120, and FIG. 3, which is a flow diagram of an example process 300 for detecting a modification of a first image in a second image.

In operation, the detection subsystem 120 accesses data identifying first and second images (302). For example, each first image 132 has a corresponding set of second images 134. The first image 132 and each second image 134 define an image pair. Each second image 134 is an image that has been determined to satisfy a threshold match of visual similarity to the first image 132. The images are selected from a larger corpus of image resources 116, such as images that have been indexed by the search system 110.

For example, the detection subsystem 120, by use of one or more image feature analysis 122 techniques, may identify second images that each has a visual similarity score that satisfies a visual similarity threshold. The visual similarity score is, for example, a score that is a measure of visual similarity of the first image to the second image based on their respective image content. Such feature analysis techniques that can be used to generate the visual similarity score include edge detection, corner detection, blob detection, scale invariant feature transforms, and other image processing techniques. As used herein, a feature is a function of one or more measurements, computed so that it quantifies some significant characteristic of the image. Features may be global or local. In particular, global image features quantify characteristics of an entire image, while local image features quantify characteristics of particular region of the image. An example of the former is a color histogram for an image, and an example of the latter is detected edges at a particular location in the image. The detection of similar images can be based on either local or global features, or a combination of both local and global features.

With respect to FIG. 2A, the second image 204 is selected for the first image 202, as the second image 204 satisfies a threshold match of visual similarity to the first image 202. Although only one second image 204 is shown in FIG. 2A, there may be multiple second images 204, each slightly different from the first image 202 and from each other.

The detection subsystem 120 determines, for each pair of the first image 132 and a second image 134, a respective set of local image feature descriptions (304). For example, for the image pair of the first and second images 132 and 134, respective image features 133 and 135 are determined. In some implementations, the local image descriptors are local image features as opposed to global image features. Each local image feature description describes a local image feature detected in the image, such as an edge, and the location of the local image feature within the image. A variety of appropriate local image descriptions can be determined. Examples include edges, intensity patterns, and the like. The local image feature descriptions can be the same that were used to identify the second image 134 for the first image 132, or, alternatively, can be a set of local image feature descriptions determined from a different image feature analysis technique.

Figure 2B:
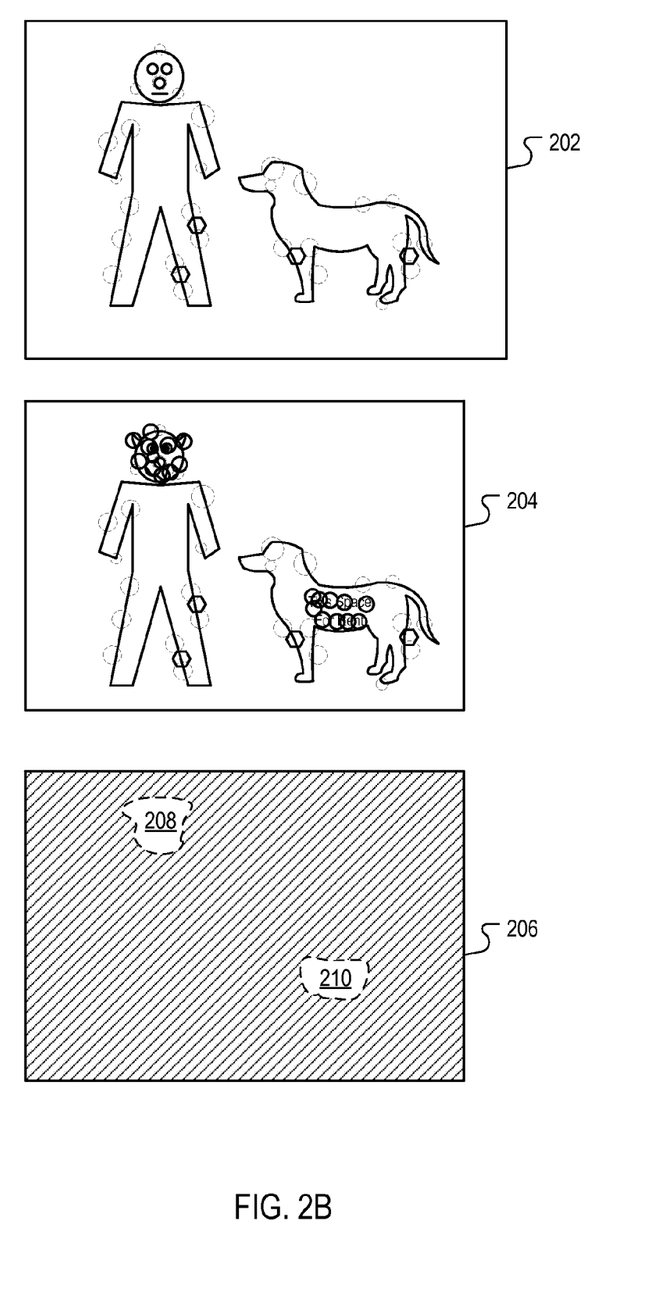
FIG. 2B depicts feature matches and mismatches in the first and second images, and resulting unmatched regions.
Figure 4:
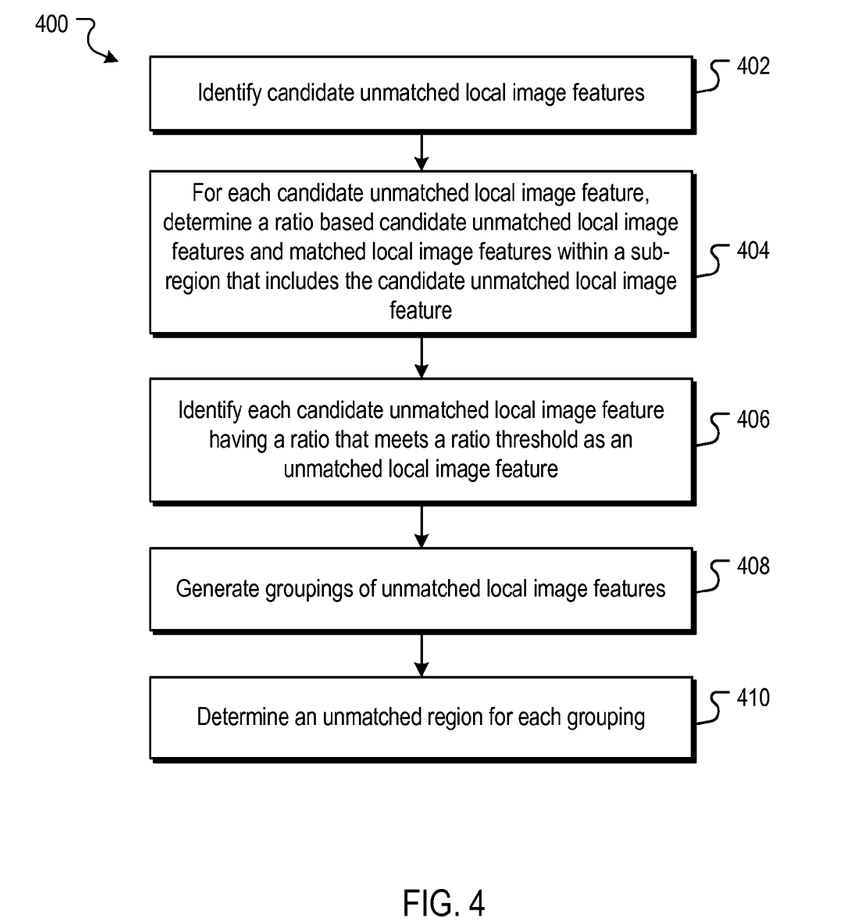
FIG. 4 is a flow diagram of an example process for determining unmatched regions based on local image features.

The detection subsystem 120 determines, from the respective sets of local image feature descriptions, unmatched local image features (306). Each unmatched local image feature is a local image feature in one of the respective sets that does not have a corresponding matching local image feature in the other of the respective sets. For example, FIG. 2B depicts the location of matching local image features by the dotted circle indicators, and unmatched local image features by the solid circle indicators and solid hexagon indicators. Some unmodified regions of the images have unmatched local image features due to feature processing artifacts and slight differences in the images. However, the highest density of unmatched features occurs in the region where the second image 204 has been modified. The unmatched features that are due to feature processing artifacts and slight differences in the images are considered to be false positive detections of unmatched features, and are indicated by the hexagons. FIG. 4 describes, in part, a filtering process that removes such false positive unmatched features.

The result of the alignment and feature filtering process 124 is a set of unmatched features 125. From these unmatched local image features 125, the detection subsystem 120 determines one or more unmatched regions of the images (308). Each unmatched region includes unmatched image features and corresponds to one or more same respective regions in both the first image and the second image. For example, in FIG. 2B, the unmatched regions 208 and 210 are determined from the unmatched features that are retained after a filtering process. The unmatched regions 208 and 210 correspond to the portions of the original image 202 that were modified in the modified image 204. FIG. 4 describes, in part, an unmatched region detection 126 process that determines the unmatched regions.

The detection subsystem 120 determines, for each of the one or more unmatched regions of the images, a modification measure based on the image data corresponding to the unmatched region in the first image and the image data corresponding to the unmatched region in the second image (310). The modification measure is based on a modification detection 128 process that takes into account the image data corresponding to the unmatched region in the first image and the image data corresponding to the unmatched region in the second image. A variety of content-based feature analysis techniques can be used to determine a modification measure. Additionally, some modification measures are highly indicative of spoofy type modifications, and such measures can be used not only to detect modifications, but also to detect if the modification is likely a spoofy modification. Two such modification measures are face modification detection and text modification detection.

For example, for face modification detection, the detection subsystem 130 can use the following detection scheme on the data for each unmatched region:

$$F = \begin{cases} 0 & \text{if neither image has a face} \\ 1 & \text{if images have a different number of faces} \\ |f(I1) - f(I2)| & \text{otherwise} \end{cases}$$

The function f(I) can be a function that outputs a vector (or some other result) that quantifies features of one or more detected faces. In some implementations, the function f(I) may also generate one or more values that quantifies the number of detected faces and the similarity of the faces in the two images. Thus, if a face has been modified, the resultant magnitude will decrease in proportion to the degree of the modification.

The scheme above is one example detection scheme, and any appropriate face modification detection scheme can be used. For example, with respect to FIG. 2B, the detection scheme F applied to the image data for the region 208 in each respective image 202 and 204 would output a score near 5 indicating a modification of a face, based on the modification to the face in the image 204.

For text modification detection, the detection subsystem 130 can use the following detection scheme on the data for each unmatched region:

$$T=|t(I1)-t(I2)|$$

The function t(I) can be a function that outputs a vector (or some other result) that quantifies features of detected text in an image. The value of the function T may vary between 0 and 1, for example, and the higher the value of T, the more likely it is that text was inserted or removed in an unmatched region between the first and second images. For example, with respect to FIG. 2B, the detection scheme T applied to the image data for the region 210 in each respective image 202 and 204 would output a score near unity based on the addition of the text "This space for rent" in the image 204.

The detection subsystem 120 that the second image is a modification of the first image when one of the modification measures meets a modification measure threshold (312). The modification measure threshold may be selected such that the resulting modification score that meets the threshold is indicative of a minimum likelihood that the second image is a modification of the first image. In the event that facial or textual modifications are detected, then the system 120 may also determine that the second image is a spoofy image of the first image.

Determining Unmatched Regions

FIG. 4 is a flow diagram of an example process 400 for determining unmatched regions based on local image features.

The detection subsystem 130 identifies candidate unmatched local image features (402). Each candidate unmatched local image feature is a local image feature in one of the respective sets that does not have a corresponding matching local image feature in the other of the respective sets. For example, with respect to FIG. 2B, the features indicated by the solid circles and the hexagons correspond to candidate unmatched local image features.

The detection subsystem 130, for each candidate unmatched local image feature, determines a ratio based on candidate unmatched local image features and matched local image features within a sub-region that includes the candidate unmatched local image feature (404). The ratio of candidate unmatched local image features to matched local image features will be relatively high for sub-regions that are modified relative to sub-regions that are not modified. Each sub-region may be a sub-portion of the image within a predefined distance of the candidate unmatched feature. For example, with respect to FIG. 2B, the ratio of the unmatched features in the unmodified portions of the images to matched features is much less than the ratio of the unmatched features in the modified portions of the images to matched features.

The detection system 130 identifies each candidate unmatched local image feature having a ratio that meets a ratio threshold as an unmatched local image feature (406). For example, with respect to FIG. 2B, the ratio for each unmatched feature in the unmodified portions of the images does not exceed a ratio threshold. Accordingly, the candidate unmatched features indicated by the hexagons are not identified as unmatched local image features. Conversely, the ratio of the unmatched feature in the modified portions of the images to matched features does exceed the ratio threshold. Accordingly, the candidate unmatched features indicated by the circles are identified as unmatched local image features.

The detection system 130 then generates groupings of unmatched local image features (408). For example, for the features that are identified as unmatched local image features, the detection system generates one or more feature clusters. Each feature cluster is generated by grouping into the feature cluster unmatched local image features that are each within a respective distance of an unmatched local image feature that belongs to the feature cluster. For example, the detection subsystem 130 will select one unmatched local image feature and attempt to build a cluster around it. Other unmatched local image features within a threshold distance of selected unmatched local image feature are added to the cluster. Likewise, for each unmatched local image feature added to the cluster, other unmatched local image features that are within a respective threshold distance are also added to the cluster. The process continues until all unmatched local image features have been processed.

The detection subsystem 130 then determines an unmatched region for each grouping (410). For example, for each unmatched region, the detection system 130 determines whether the region meets a minimum size threshold, and retains the region only if the minimum size threshold is met. This filters out small regions that may be the result of unmatched local image features that are due to compression artifacts and not due to other modifications.

In a variation of this implementation, the detection subsystem 130 can also determine respective color histograms for each of the first image and the second image from the respective image data corresponding to the unmatched region, and retain the region only if a correlation of the underlying respective color histogram data does not meet a correlation threshold. This filters out regions that may be the result of unmatched local image features but are, in fact, detected as being different due to compression artifacts and not due to other modifications.

For each of the regions that are retained, the detection subsystem 130 generates a periphery border that surrounds the unmatched local image features that belong to the region. For example, in one implementation, the detection subsystem 130 connects nodes that each respectively correspond to an unmatched feature by a minimum spanning tree. The length of the longest edge in the tree defines a maximum distance required to maintain graph connectivity. Then a line is drawn between each pair of nodes that are less than or equal to the maximum distance. The resulting outer periphery border defines the region. For example, as shown in FIGS. 2A and 2B, the region 208 and 210 are defined by their respective outer peripheries.

Processing Image Data from Unmatched Regions

Figure 5:
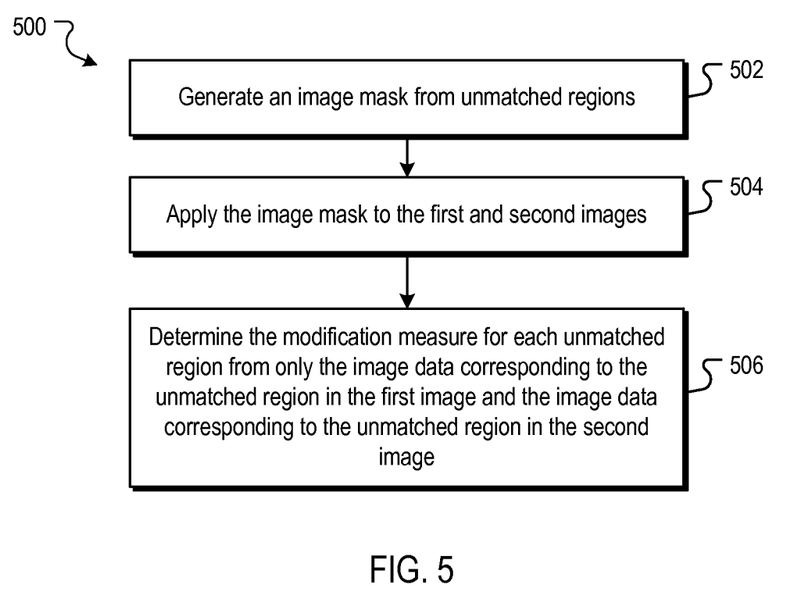
FIG. 5 is a flow diagram of an example process for determining a modification measure from image data of unmatched regions.

After the unmatched regions are determined, the image data from the image pair are processed to determine a modification measure for each unmatched region. FIG. 5 is a flow diagram of an example process 500 for determining a modification measure from image data of unmatched regions.

The detection subsystem 130 generates an image mask from the unmatched regions (502). The image mask masks only data outside of each of the unmatched regions. For example, with respect to FIG. 2B, the data for each image outside of the regions 208 and 210 are masked from processing, and thus only the image content from within the regions 208 and 210 are processed to determine whether the second image 204 is a modification of the image 202.

The detection subsystem 130 applies the image mask to each of the first image and the second image (504). For example, with respect to FIG. 2A, the content from only the respective areas 208 and 210 in each of the images 202 and 204 will be processed to determine if a modification has been made.

The detection subsystem 130 determines the modification measure for each unmatched region from only the image data corresponding to the unmatched region in the first image and the image data corresponding to the unmatched region in the second image (506). For example, for the region 208, the detection subsystem 130 will generate a modification measure based on the face detection scheme that indicates a face was modified. For the region 210, the detection subsystem 130 will generate a modification measure based on the text detection scheme that indicates text was added (or deleted).

Additional Implementation Details

As described above, other detection processes can be used to determine if respective unmatched regions of an image differ due to an image modification. The modifications measures need not be indicative "spoofy" modifications. For example, in some implementations, images that have been determined to be modified may undergo additional detection processes (or even human review) to determine if an image includes a spoofy modification.

The examples above are described in the context of a known unmodified image. However, a particular image need not be identified as unmodified, and each image pair that is determined to have one image that differs from the other may be individually evaluated for spoofy modifications. For example, the underlying traffic data associated with the image may be evaluated to determine if the image is spoofy. An image for which image search results exhibit a large number of "hovers" relative to other images for queries, but which also have a low number of selections (or some other click metric), may be classified as a spoofy image. Alternatively, an image for which search results have a relatively high number of selections for queries belonging to a certain category (e.g., humor, such as "Funny Images of the President"), but a relatively low number of selections for other categories (e.g., non-humor categories) may also be classified as a spoof. Various other click metrics, hover metrics, and other traffic signal metrics may be used to make these determinations. Thus, even if each image in an image pair is a different "spoof" of an original image, both images may still be identified as spoofy images.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
   determining, for each of a first image and a second image, each of the first and second image comprising respective image data depicting visual content, a respective set of local image feature descriptions, each local image feature description describing a local image feature detected in the image and the location of the local image feature within the image;
   determining one or more unmatched regions of the images that include unmatched image features and that correspond to one or more same respective regions in both the first image and the second image;
   determining, for each of the one or more unmatched regions of the images, a modification measure based on the image data corresponding to the unmatched region in the first image and the image data corresponding to the unmatched region in the second image; and
   determining that the second image is a modification of the first image when one of the modification measures meets a modification measure threshold;
   wherein:
   determining one or more unmatched regions of the images comprises:
   determining, from the respective sets of local image feature descriptions, unmatched local image features, each unmatched local image feature being a local image feature in one of the respective sets that does not have a corresponding matching local image feature in the other set of the respective sets; and
   determining, from the unmatched local image features, one or more unmatched regions of the images that include unmatched image features and that correspond to one or more same respective regions in both the first image and the second image.

2. The computer-implemented method of claim 1, wherein:
   the second image is an image that has been determined to satisfy a threshold match of visual similarity to the first image.

3. The computer-implemented method of claim 2, wherein determining unmatched local image features comprises:
   identifying candidate unmatched local image features, each candidate unmatched local image feature being a local image feature in one of the respective sets that does not have a corresponding matching local image feature in the other set of the respective sets;
   for each candidate unmatched local image feature, determining a ratio based candidate unmatched local image features and matched local image features that within a sub-region that includes the candidate unmatched local image feature; and
   identifying each candidate unmatched local image feature having a ratio that meets a ratio threshold as an unmatched local image feature.

4. The computer-implemented method of claim 3, wherein determining one or more unmatched regions of the images comprises:
   for each image:
   generating one or more feature clusters, each feature cluster being generated by grouping into the feature cluster unmatched local image features that are each within a respective distance of an unmatched local image feature that belongs to the feature cluster; and
   determining, for each feature clusters, a boundary that includes the unmatched local image features that belong to the feature cluster, wherein the boundary defines an unmatched region.

5. The computer-implemented method of claim 4, further comprising:
   generating an image mask from the unmatched regions, the image masking only data outside of each of the unmatched regions; and
   wherein determining, for each of the one or more unmatched regions of the images, a modification measure based on the image data corresponding to the unmatched region in the first image and the image data corresponding to the unmatched region in the second image comprises:
   applying the image mask to each of the first image and the second image; and determining, for each of the one or more unmatched regions of the images, the modification measure comprises determining the modification measure for each unmatched region from only the image data corresponding to the unmatched region in the first image and the image data corresponding to the unmatched region in the second image.

6. The computer-implemented method of claim 5, wherein generating an image mask from the unmatched regions comprises:
for each unmatched region, determining whether the region meets a minimum size threshold; and
generating the image mask from only unmatched regions that meet the minimum size threshold.

7. The computer-implemented method of claim 5, wherein generating an image mask from the unmatched regions comprises:
for each unmatched region, determining respective color histogram data for each of the first image and the second image from the respective image data corresponding to the unmatched region; and
generating the image mask from only unmatched regions for which a correlation of the respective color histogram data does not meet a correlation threshold.

8. The computer-implemented method of claim 2, wherein determining, for each of the one or more unmatched regions of the images, a modification measure based on the image data corresponding to the unmatched region in the first image and the image data corresponding to the unmatched region in the second image comprises:
determining a modification measure based on first facial features detected in the image data corresponding to the unmatched region in the first image and second facial features detected in the image data corresponding to the unmatched region in the second image.

9. The computer-implemented method of claim 1, wherein determining, for each of the one or more unmatched regions of the images, a modification measure based on the image data corresponding to the unmatched region in the first image and the image data corresponding to the unmatched region in the second image comprises:
determining a modification measure based on first text features detected in the image data corresponding to the unmatched region in the first image and second text features detected in the image data corresponding to the unmatched region in the second image.

10. The computer-implemented method of claim 1, wherein the local image feature descriptions comprise one or more of edge descriptors and corner descriptors.

11. A system, comprising:
a data processing apparatus; and
a non-transitory memory storage apparatus in data communication with the data processing apparatus and storing instructions executable by the data processing apparatus and that upon such execution cause the data processing apparatus to perform operations comprising:
determining, for each of a first image and a second image, each of the first and second image comprising respective image data depicting visual content, a respective set of local image feature descriptions, each local image feature description describing a local image feature detected in the image and the location of the local image feature within the image;
determining one or more unmatched regions of the images that include unmatched image features and that correspond to one or more same respective regions in both the first image and the second image;
determining, for each of the one or more unmatched regions of the images, a modification measure based on the image data corresponding to the unmatched region in the first image and the image data corresponding to the unmatched region in the second image; and
determining that the second image is a modification of the first image when one of the modification measures meets a modification measure threshold;
wherein:
determining one or more unmatched regions of the images comprises:
determining, from the respective sets of local image feature descriptions, unmatched local image features, each unmatched local image feature being a local image feature in one of the respective sets that does not have a corresponding matching local image feature in the other set of the respective sets; and
determining, from the unmatched local image features, one or more unmatched regions of the images that include unmatched local image features and that correspond to one or more same respective regions in both the first image and the second image.

12. The system of claim 11, wherein:
the second image is an image that has been determined to satisfy a threshold match of visual similarity to the first image.

13. The system of claim 12, wherein determining unmatched local image features comprises:
identifying candidate unmatched local image features, each candidate unmatched local image feature being a local image feature in one of the respective sets that does not have a corresponding matching local image feature in the other set of the respective sets;
for each candidate unmatched local image feature, determining a ratio based candidate unmatched local image features and matched local image features that within a sub-region that includes the candidate unmatched local image feature; and
identifying each candidate unmatched local image feature having a ratio that meets a ratio threshold as an unmatched local image feature.

14. The system of claim 13, wherein determining one or more unmatched regions of the images comprises:
for each image:
generating one or more feature clusters, each feature cluster being generated by grouping into the feature cluster unmatched local image features that are each within a respective distance of an unmatched local image feature that belongs to the feature cluster; and
determining, for each feature clusters, a boundary that includes the unmatched local image features that belong to the feature cluster, wherein the boundary defines an unmatched region.

15. The system of claim 14, wherein the operations further comprising:
generating an image mask from the unmatched regions, the image masking only data outside of each of the unmatched regions; and
wherein determining, for each of the one or more unmatched regions of the images, a modification measure based on the image data corresponding to the unmatched region in the first image and the image data corresponding to the unmatched region in the second image comprises:
applying the image mask to each of the first image and the second image; and determining, for each of the one or more unmatched regions of the images, the modification measure comprises determining the modification measure for each unmatched region from only the image data corresponding to the unmatched region in the first image and the image data corresponding to the unmatched region in the second image.

16. The system of claim 15, wherein generating an image mask from the unmatched regions comprises:
for each unmatched region, determining whether the region meets a minimum size threshold; and
generating the image mask from only unmatched regions that meet the minimum size threshold.

17. The system of claim 15, wherein generating an image mask from the unmatched regions comprises:
for each unmatched region, determining respective color histogram data for each of the first image and the second image from the respective image data corresponding to the unmatched region; and
generating the image mask from only unmatched regions for which a correlation of the respective color histogram data does not meet a correlation threshold.

18. A non-transitory memory storage apparatus storing instructions executable by a data processing apparatus and that upon such execution cause the data processing apparatus to perform operations comprising:
determining, for each of a first image and a second image, each of the first and second image comprising respective image data depicting visual content, a respective set of local image feature descriptions, each local image feature description describing a local image feature detected in the image and the location of the local image feature within the image;
determining one or more unmatched regions of the images that include unmatched image features and that correspond to one or more same respective regions in both the first image and the second image;
determining, for each of the one or more unmatched regions of the images, a modification measure based on the image data corresponding to the unmatched region in the first image and the image data corresponding to the unmatched region in the second image; and
determining that the second image is a modification of the first image when one of the modification measures meets a modification measure threshold;
wherein:
determining one or more unmatched regions of the images comprises:
determining, from the respective sets of local image feature descriptions, unmatched local image features, each unmatched local image feature being a local image feature in one of the respective sets that does not have a corresponding matching local image feature in the other set of the respective sets; and
determining, from the unmatched local image features, one or more unmatched regions of the images that include unmatched image features and that correspond to one or more same respective regions in both the first image and the second image.

* * * * *